United States Patent Office 3,148,020
Patented Sept. 8, 1964

3,148,020
SHAPED ORGANIC POLYMERS-POLYSULFONE GRAFTS WITH ORGANIC POLYMER COATING AND PRODUCTION THEREOF
Boynton Graham, Wilmington, Del., assignor to E. I. du Pont de Nemours and Company, Wilmington, Del., a corporation of Delaware
No Drawing. Filed Mar. 13, 1961, Ser. No. 95,033
26 Claims. (Cl. 8—115.5)

This invention is concerned with, and has as its principal objects provision of, certain stabilized graft copolymers and a process for their preparation.

It is well known that the high molecular weight, polymeric olefin-polysulfones prepared by the reaction of olefins and sulfur dioxide are readily and completely degraded to low molecular weight, soluble products by alkalies as shown in U.S. Patent 2,102,654.

Recently it has been found that graft copolymers of olefin-polysulfones on organic polymers can be readily prepared by irradiating a solid organic polymer substrate with ionizing radiation, either prior to or during contact of the substrate with a mixture of sulfur dioxide and an olefin. Once the grafting reaction is initiated, particularly when oxygen is excluded, it may be allowed to continue, and products weighing many times the weight of the original substrate may be obtained. These graft copolymers have many desirable properties that make them highly useful in the form of films, fibers, fabrics, bottles, pipe, and the like.

The grafted olefin-polysulfone portion of these graft copolymers has been found to be susceptible to degradation into soluble products by the action of alkalies. Extended treatment, even with dilute alkalies, as in some aqueous soap solutions, will bring about this degradation to some extent, and treatment with strong caustics will remove substantially all of the grafted polysulfone. It is, therefore, highly desirable to provide stabilization of these graft copolymers of olefin-polysulfones against degradation by alkali.

It has now been discovered that the alkali resistance of the graft copolymers of olefin-polysulfones on organic polymer substrates can be markedly improved by treating a shaped structure of a graft copolymer of an olefin-polysulfone on an organic polymer substrate with an aqueous alkali of pH 13 or greater until the grafted olefin-polysulfone in an outer layer of graft copolymer has been degraded to products soluble in the aqueous alkali and removing the aqueous alkali and soluble degradation products from the said layer. The products are the graft copolymers of olefin-polysulfones on organic polymer substrates bearing an integral coating of the regenerated organic polymer substrate.

The coating layer of regenerated organic polymer substrate is preferably substantially free of grafted olefin-polysulfone and its alkali degradation products. In preparing such a layer by alkali degradation, as above, the use of an aqueous medium with pH about 13 or greater is necessary. At pH 13 or greater, the grafted polysulfone on the surface of the graft copolymer is rapidly degraded. When degradation has proceeded to the desired depth and before it has proceeded completely through the graft copolymer, it is terminated. The termination of degradation at this step is essential in order for the coating layer to develop its stabilizing properties. Termination may be carried out by washing with water or a suitable solvent, by drying the treated article, by a combination of washing and drying, by neutralization of the alkali, or by any other suitable means.

The termination must be of such nature that a major proportion of the aqueous alkali and the soluble polysulfone degradation products are removed from the coating layer. Simple drying accomplishes this result since these soluble materials are largely brought to the outer surface in the drying process. Coating layers of preferred stabilizing effect against further alkali degradation are obtained when the termination involves washing, preferably with water. In this manner, 90% and more of the alkali and degradation products may be removed from the coating layer.

While it is not desired to be bound by speculation, the effect of the termination step may have the following physical explanation. In the preparation of graft copolymers by the action of an olefin and sulfur dioxide on an irradiated organic substrate having at least one initial dimension of 0.05 inch or less, grafting occurs rapidly and uniformly throughout the substrate and results in measurable physical growth with minimum distortion of the shape of the original substrate. When such a product is subjected to alkali degradation of the polysulfone graft without removal of any substantial part of the degrading alkali and soluble degradation products (i.e., the situation represented by the mid-point in a simple, uninterrupted alkali treatment), the spaces formerly occupied by the grafted polysulfone may remain open as channels for penetration of alkali into the interior of the shaped object. On the other hand, removal of at least a major proportion of the alkali and degradation products may permit collapse of the outer layer of substrate to a structure approaching that prior to the original grafting operation, thereby creating an outer coating layer of regenerated, substantially unmodified substrate which is more resistant to aqueous alkali than the graft copolymer it protects.

The thickness of the coating layer may be varied widely. Coating layers as thin as 0.1 micron in thickness provide some improved resistance to mild alkali solutions over an untreated graft copolymer of the same core composition. There is no practical upper limit for the thickness of the coating layer, though it obviously should not exceed half the original minimum dimension of the graft copolymer prior to stabilization. In general, it is preferred that the thickness of the coating layer should not exceed one-fourth the original minimum dimension of the graft copolymer structure prior to stabilization. With graft copolymers in the form of bulky molded objects, coating layers as thick as 0.01 inch may be prepared. There is little advantage in coating layers thicker than 0.001 inch.

Most coating layers prepared according to this invention give at least some response to a test for sulfinic acid groups. Such groups are characteristic in the degradation products of olefin-polysulfones. In the coating layers of this invention they may represent ends of grafted olefin-polysulfone chains which were incompletely degraded at the time of termination (i.e., at the face between the regenerated coating layer and the inner core of undegraded graft copolymer). They may also represent traces of soluble degradation products not completely washed from the coating layer or traces of sulfinic acid groups remaining on the regenerated polymer of the coating layer.

Graft copolymers suitable for stabilization according to this invention are the graft copolymers containing at least 1% of grated olefin/sulfur dioxide polysulfones on solid organic polymers. The preferred graft copolymers for use in this invention are those that initially contain a weight of grafted olefin-polysulfone that is at least equal to the weight of the original substrate prior to grafting.

Organic polymers suitable as substrates in these graft copolymers include any normally solid (including rubbery elastic) water-insoluble organic synthetic or natural polymeric material with molecular weight of 5000 or greater and having, of course, a substantial inherent resistance to aqueous alkali. The polymers may be linear, branched, isotactic, or atactic and may be oriented or unoriented. Thus, there may be employed hydrocarbon polymers, such as polyethylene, polypropylene, polystyrene, polybutadiene, rubber, polyisobutylene, butadiene/styrene copolymers and the like; halogenated and hydrocarbon polymers, such as polyvinyl chloride, polyvinylidene chloride, polychloroprene, polytetrafluoroethylene, polyvinyl fluoride, vinylidene fluoride/hexafluoropropylene copolymers, and the like; ester-containing polymers, such as polymethyl methacrylate, polyethylene terephthalate, poly(p-hexahydroxylylene terephthalate), and the like; hydroxy-containing polymers, such as cellulose, regenerated cellulose, and the like; ether-containing polymers, such as solid polytetrahydrofuran, polyoxymethylene, dioxolane polymers, ethylene oxide polymers, and the like; condensation polymers, such as phenol-formaldehyde polymers, urea-formaldehyde polymers, triazine-formaldehyde polymers, polyamides, polyesters, polyimides, and the like; polyacrylonitrile, polyvinyl acetals, polyureas, polyurethanes, and mixtures or copolymers based on two or more of the above compounds, as well as natural polymers such as cotton, and the like.

Of these organic polymer substrates, a preferred class, because of their inherent resistance to aqueous alkali, are those in which the backbone chain of the substrate material is substantially entirely a chain of carbon atoms and particularly those polymers in which such carbon chains are free of aliphatic carbon-to-carbon unsaturation, i.e., the vinyl polymers. Still more preferred, because they most readily form olefin-polysulfone graft copolymers, are the hydrocarbon polymers of the above group, such as polyethylene, polypropylene, polyisobutylene, polystyrene, and the like.

Olefins suitable for use in preparing these graft copolymers are those known in the art to react with sulfur dioxide to yield olefin/$SO_2$ polysulfones. Thus, there may be employed such olefins as ethylene, propylene, isobutylene, 1-butene, 1-pentene, 2-pentene, 1-octene, 1-nonene, 1-eicosene, cyclohexene, 3-cyclohexyl-1-propene, 3 - methyl - cyclohexene, 4 - isopropyl - 1 - methyl - 3-cyclohexene, butadiene, isoprene, 1,4-pentadiene, 1,5-hexadiene, allyl alcohol, styrene, and the like.

The stabilized graft copolymers of this invention comprise a core of one of the above graft copolymers with a stabilizing coating of the organic polymer substrate. Substrates which inherently possess some resistance to aqueous alkali of pH 13 or greater are preferred.

Graft copolymers for use in this invention are conveniently prepared by irradiating the organic polymer substrate with ionizing radiation, either prior to or during contacting the substrate with a mixture of sulfur dioxide and the selected olefin. Several specific modes for preparing these graft copolymers are illustrated in Part A of Examples I–V which follow.

The stabilization process of the present invention employs the starting polysulfone graft copolymers in substantially the shape desired for the finished stabilized product. Some alterations of the dimensions of the stabilized product are possible without destroying the continuity of the stabilizing coating layer. However, complete reshaping, as in shredding and remolding or re-extruding operations, destroys the effect of the coating layer. The graft copolymer starting material may be in the form of fiber, thread, monofilament, fabric, paper, foam, beading, ribbon, tube, pipe, bottle, film, sheet, powder, granule, and the like, the shape suited for the final intended use being selected prior to the stabilization treatment, and preferably prior to the grafting step.

The starting polysulfone graft copolymers may contain additives, such as carbon, plasticizers, inert fillers, pigments, dyes, and the like, which have no substantial effect on the formation of the stabilizing layer.

The process of this invention may be carried out by simply bringing together the polysulfone graft copolymer and the aqueous alkali until an exposed layer of polysulfone graft has been degraded and then removing the alkali. The removal of the alkali may take the form of removing the source of additional alkali for further degradation as in drying the treated product, or it may involve removal of alkali in the treated layer by washing, neutralization with acid, etc. Temperature is not a critical factor in the degradation reaction and may be varied widely, temperatures in the range of 0–100° C. being preferred. Room temperature is entirely satisfactory. Pressure is also not a critical factor, pressures both above and below atmospheric pressure being fully operable though atmospheric pressure is preferred and convenient. Time is not a critical factor per se, the time required for the formation of the stabilizing layer of substrate being dependent, among other things, on the strength of the alkali, the temperature of reaction, the penetration rate of the alkali into the particular graft copolymer being treated, and the thickness of the coating layer desired. Generally, treating times of at least 5 and, preferably, 15 minutes are necessary to obtain good stabilization. Such minimal treatments remove at least 3–14% of the grafted olefinic-polysulfone.

Aqueous alkalies suitable for carrying out the present invention comprise aqueous solutions of pH 13 or greater. Alkalies which can give aqueous solutions in this range of pH include alkali metal hydroxides such as lithium hydroxide, sodium hydroxide, potassium hydroxide, rubidium hydroxide, and cesium hydroxide, and quaternary ammonium hydroxides, such as tetramethylammonium hydroxide, tetraethylammonium hydroxide, and the like.

The association of the effect of stabilization against alkali with the surface of the treated graft copolymer is confirmed by the observation that when the treated surface is removed by cutting or by severe abrasion, the resistance to alkali is lost in the areas so exposed.

In the following examples, parts are by weight unless otherwise specified.

EXAMPLE I

Part A

A film of polyethylene, 0.0015 inch thick and weighing 45 parts, is wrapped in aluminum foil one mil thick and irradiated at −78° C. with 2 mev. electrons to a dosage of 1.25 mrads. The irradiated film is placed in a pressure vessel chilled to −78° C. and containing 200 parts of water and 4,000 parts of sulfur dioxide. The vessel is purged three times with ethylene gas and then 4,000 parts of ethylene is distilled into the vessel. It is sealed and agitated by rocking for 30 minutes at −15 to −2° C. The resulting graft copolymer film shows a weight gain of 134% and contains ethylene/sulfur dioxide polysulfone grafted substantially uniformly throughout the bulk of the polyethylene starting material.

Part B

A film of ethylene polysulfone:polyethylene 134:100 graft copolymer, prepared as described in Part A above, is agitated for one hour at room temperature in about 100 times its weight of 10% aqueous sodium hydroxide, then rinsed with water, and air-dried. Weight loss is 16.2%. The film remains clear, smooth, and tough. No further weight is lost upon subsequent similar treatments with 10% sodium hydroxide for one hour and four hours, respectively.

EXAMPLE II

Part A

A film of polyethylene, 0.0015 inch thick and weighing 373 parts, is wrapped in aluminum foil and irradiated at −78° C. with 2 mev. electrons to a dosage of 6.25 mrads. The irradiated film is placed in a pressure vessel chilled to −78° C. and containing 200 parts of water and 8,000 parts of sulfur dioxide. The vessel is purged three times with ethylene and then pressured to 700 lb./ sq. in. with ethylene. The vessel is agitated by rocking for four hours at 25° C., pressure being maintained at 700 lbs./sq. in. by addition of ethylene. The resulting graft copolymer film of ethylene polysulfone:polyethylene shows a weight gain of 308%.

*Part B*

A film of ethylene polysulfone:polyethylene 308:100 graft copolymer, prepared as described in Part A of this example, is agitated for 15 minutes at room temperature in about 100 times its weight of 10% aqueous sodium hydroxide, then rinsed with water, and air-dried. Weight loss is 7%. There is only 4% further weight loss upon further treatment with 10% sodium hydroxide for 24 hours. Examination of a cross section of this film in a phase contrast microscope shows a thin skin about 1.0 micron in thickness. In contrast, a similar film agitated in 10% aqueous sodium hydroxide for 24 hours at room temperature without the 15-minute pretreatment loses 66% in weight. In further contrast, a molded bar, 0.3 cm. thick, of ungrafted ethylene polysulfone loses 35% in weight when agitated for one hour at room temperature in 10% aqueous sodium hydroxide and completely dissolves when further agitated for eight hours.

EXAMPLE III

*Part A*

A film of crystalline polypropylene, approximately 0.001 inch thick and weighing 30 parts, is wrapped in aluminum foil and irradiated at −78° C. with 2 mev. electrons to a dosage of 1.25 mrads. The irradiated film is placed in a pressure vessel chilled to −78° C. and containing 1,000 parts of sulfur dioxide and 500 parts of butadiene. The vessel is sealed and agitated by shaking for three hours at 35° C. The resulting graft copolymer film of butadiene polysulfone:polypropylene shows a weight gain of 119%.

*Part B*

A film of butadiene polysulfone:polypropylene (BD/SO$_2$:PP) 119:100 graft copolymer, prepared according to the procedure of Part A of this example, is agitated for eight hours at room temperature in about 100 times its weight of 10% aqueous sodium hydroxide, then rinsed with water, and dried. Weight loss is 7.5%. Further agitation in 10% aqueous sodium hydroxide for 24 hours gives a further weight loss of 6.3%. In contrast, a graft copolymer film agitated in 10% aqueous sodium hydroxide for 24 hours at room temperature without pretreatment loses 15.8% in weight.

EXAMPLE IV

*Part A*

Melt-spun, undrawn, high density polyethylene yarn, weighing 147 parts, is wrapped in aluminum foil and irradiated at −78° C. with 2 mev. electrons to a dosage of 6.25 mrads. The irradiated yarn is placed in a pressure vessel chilled to −78° C. and containing 200 parts of water and 4,000 parts of sulfur dioxide. The vessel is purged three times with ethylene gas and then pressured to 700 lb./sq. in. with ethylene. The vessel is agitated for four hours at 25° C., pressure being maintained at 700 lb./sq. in. by addition of ethylene. The resulting graft copolymer of ethylene polysulfone:polyethylene yarn shows a weight gain of 323%.

*Part B*

Yarn of ethylene polysulfone:polyethylene 323:100 graft copolymer, prepared as shown in Part A of this Example (Yarn A), is agitated for 15 minutes in about 100 times its weight of 10% aqueous sodium hydroxide, then rinsed with water, and dried. The weight loss is 18.9% (Yarn B). When further agitated for 24 hours in 10% aqueous sodium hydroxide, this stabilized graft copolymer Yarn B loses only 17.4% in weight; whereas, the unstabilized Yarn A similarly treated for 24 hours in 10% aqueous sodium hydroxide loses 68% in weight. Examination of a cross section of Yarn B in a phase contrast microscope shows a sharp skin-core structure, the skin being 3.2 microns thick; whereas, Yarn A shows no structure under phase contrast. Separate portions of Yarn A and Yarn B are heated in 1% aqueous sodium hydroxide for 30 minutes at 100° C. In this treatment, Yarn A loses 46% in weight; whereas, stabilized Yarn B loses only 3.9% in weight.

EXAMPLE V

*Part A*

A film of polyethylene oriented in both directions, approximately 0.001 inch thick and weighing 19.5 parts, is wrapped in aluminum foil and irradiated at −78° C. with 2 mev. electrons to a dosage of 3.75 mrads. The irradiated film is immersed in a solution of 5,000 parts of sulfur dioxide and 1,400 parts of butadiene in a mixture of 11,000 parts of 1,2-dimethoxyethane and 2,500 parts of benzene. The film is allowed to stand in this solution for 30 minutes at 10–20° C. under atmospheric pressure. The resulting graft copolymer film of butadiene polysulfone:polyethylene shows a weight gain of 130%.

*Part B*

A film of butadiene polysulfone:polyethylene (BD/SO$_2$:PE ratio 130:100), prepared as shown in Part A of this Example and weighing 14.16 parts, is agitated for 22 hours at room temperature in about 5,000 parts of 5% aqueous sodium hydroxide. It is then rinsed with water and dried. The weight loss is 2.19%. The treated graft copolymer film is again immersed in 5% sodium hydroxide, allowed to stand for 26 hours at room temperature, and is then rinsed with water and dried. There is no measurable weight loss in this second caustic treatment.

EXAMPLES VI–VIII

A film of a graft copolymer of ethylene polysulfone on polyethylene prepared by the procedure of Part A of Example I and showing a weight gain of 145% in the grafting operation is divided into three portions. These are treated with aqueous sodium hydroxide of the indicated concentration for the indicated length of time. The films are then washed with water and dried and the weight loss is determined. All these treated films show substantially improved resistance to degradation by further treatment with alkali over the untreated graft copolymer film.

| Example | Conc. of NaOH | Time | Weight Loss, percent |
|---|---|---|---|
| VI | 1% (pH 13.4) | 16 hours | 6.5 |
| VII | 10% | 15 minutes | 3.1 |
| VIII | 50% | 30 minutes | 2.1 |

EXAMPLE IX

This example illustrates that effective stabilization is obtained when the termination step involves rinsing alone without drying. A film identical to that employed in Example VI is agitated for one hour at room temperature in 10% aqueous sodium hydroxide. It is then thoroughly rinsed with water. Without drying, the resulting stabilized film is further agitated for three days in 10% aqueous sodium hydroxide. It is then rinsed with water and dried. The total weight loss, including the stabilization step, is 17%; whereas, an identical unstabilized control film agitated for 24 hours in 10% aqueous sodium hydroxide without interruption loses 34% in weight.

EXAMPLE X

This example illustrates that effective stabilization is obtained when the termination step involves drying alone. A film identical to that employed in Example VI is agitated for one hour at room temperature in 10% aqueous sodium hydroxide. Without rinsing, the film is then dried for 24 hours at room temperature under vacuum at 0.01 mm. The resulting stabilized film is then further agitated for 24 hours in 10% aqueous sodium hydroxide, followed by rinsing with water and drying. The total weight loss, including that of the stabilization step, is 10.5%; whereas, an identical unstabilized control film agitated 24 hours in 10% aqueous sodium hydroxide without interruption loses 34% in weight.

EXAMPLE XI

Part A

A length of ⅛" wall, 1⅛" I.D., low density, polyethylene pipe is irradiated at −78° C. with 2 mev. electrons to a dosage of 25 mrads and then reacted with ethylene and sulfur dioxide under the conditions shown in Part A of Example IV. The weight gain is 12%.

Part B

The graft copolymer pipe obtained in Part A of this example is agitated for 15 minutes in 10% aqueous sodium hydroxide, followed by rinsing with water and drying. The resulting pipe has a caustic resistant surface, both inside and outside. The caustic treatment can, of course, be applied separately to either the inner or outer surface of the pipe as desired.

Since obvious modifications and equivalents in the invention will be evident to those skilled in the chemical arts, I propose to be bound solely by the appended claims.

The embodiments of the invention in which an exclusive property or privilege is claimed are defined as follows:

1. In a process of improving the stability toward degradation by an aqueous alkali of a copolymer of a polymeric polysulfone formed by reaction between sulfur dioxide and an olefin and grafted into an organic polymer substrate itself having a substantial inherent resistance to aqueous alkali, the step comprising contacting said copolymer with an aqueous alakil having a pH of at least 13, thereby removing olefin-polysulfone from the surface until a relatively thin external layer of the regenerated polymer substrate is formed, and then terminating the contact between the aqueous alkali and the graft copolymer.

2. The process of claim 1 in which the contact is continued until the external layer is about 0.1–10 microns thick.

3. The process of claim 1 including the sequential step of rinsing the copolymer.

4. The process of claim 1 including the sequential step of drying the copolymer.

5. The process which comprises contacting a film formed from a copolymer of a polymeric polysulfone made by reacting sulfur dioxide and ethylene and grafted into polyethylene having a molecular weight of at least 5000 with aqueous alkali having a pH of at least 13 and thereby degrading part of the polysulfone until a surface coating of regenerated polyethylene about 0.1–10 microns thick is produced, terminating the contact, and removing at least a major portion of the alkal and degradation products.

6. The process which comprises contacting a film formed from a copolymer of a polymeric polysulfone made by reacting sulfur dioxide and butadiene and grafted into polypropylene having a molecular weight of at least 5000 with aqueous alkali having a pH of at least 13 and thereby degrading part of the polysulfone until a surface coating of regenerated polypropylene about 0.1–10 microns thick is produced, terminating the contact, and removing at least a major portion of the alkali and degradation products.

7. The process which comprises contacting at least one surface of a pipe formed from a copolymer of a polymeric polysulfone made by reacting sulfur dioxide and ethylene and grafted into polyethylene having a molecular weight of at least 5000 with aqueous alkali having a pH of at least 13 and thereby degrading part of the polysulfone until a surface coating of regenerated polyethylene about 0.1–10 microns thick is produced, terminating the contact, and removing at least a major portion of the alkali and degradation products.

8. A manufacture comprising a solid preformed substrate of an organic polymer of a molecular weight of at least 5000 and a substantial inherent resistance to aqueous alkali having grafted thereinto a polymeric polysulfone formed by reaction between sulfur dioxide and an olefin and carrying a surface of the organic polymer of the substrate integral with the polysulfone.

9. A manufacture of claim 1 wherein the organic polymer of the substrate is a member of the group consisting of natural polymers and synthetic polymers selected from the group consisting of hydrocarbon polymers, halogenated hydrocarbon polymers, hydroxy-, and ether-containing polymers and condensation polymers, polyacrylonitrile, polyvinyl acetals, polyureas and polyurethanes and mixtures and copolymers thereof.

10. A manufacture comprising a solid preformed substrate of polyethylene of a molecular weight of at least 5000 having grafted thereinto a polymeric polysulfone formed by reaction between sulfur dioxide and an olefin and carrying a surface of the polyethylene of the substrate integral with the polysulfone.

11. A manufacture comprising a solid preformed substrate of polyethylene of a molecular weight of at least 5000 having grafted thereinto a polymeric polysulfone formed by reaction between sulfur dioxide and ethylene and carrying a surface of the polyethylene of the substrate integral with the polysulfone.

12. A manufacture comprising a solid preformed substrate of polyethylene of a molecular weight of at least 5000 having grafted thereinto a polymeric polysulfone formed by reaction between sulfur dioxide and butadiene and carrying a surface of the polyethylene of the substrate integral with the polysulfone.

13. A manufacture comprising a solid preformed substrate of polypropylene of a molecular weight of at least 5000 having grafted thereinto a polymeric polysulfone formed by reaction between sulfur dioxide and an olefin and carrying a surface of the polypropylene of the substrate integral with the polysulfone.

14. A manufacture comprising a solid preformed substrate of polypropylene of a molecular weight of at least 5000 having grafted thereinto a polymeric polysulfone formed by reaction between sulfur dioxide and butadiene and carrying a surface of the polypropylene of the substrate integral with the polysulfone.

15. A film comprising a solid preformed substrate of a hydrocarbon polymer of a molecular weight of at least 5000 having grafted thereinto a polymeric polysulfone formed by reaction between sulfur dioxide and an olefin and carrying a surface of the hydrocarbon polymer of the substrate integral with the polysulfone.

16. A film of claim 15 wherein the hydrocarbon polymer of the substrate is polyethylene.

17. A film of claim 16 wherein the olefin is ethylene.

18. A film of claim 16 wherein the olefin is butadiene.

19. A film of claim 15 wherein the hydrocarbon polymer of the substrate is polypropylene.

20. A film of claim 19 wherein the olefin is butadiene.

21. A fiber comprising a solid preformed substrate of a hydrocarbon polymer of a molecular weight of at least 5000 having grafted thereinto a polymeric polysulfone formed by reaction between sulfur dioxide and an olefin and carrying a surface of the hydrocarbon polymer of the substrate integral with the polysulfone.

22. A fiber of claim 21 wherein the hydrocarbon polymer of the substrate is polyethylene.

23. A fiber of claim 21 wherein the olefin is ethylene.

24. A pipe comprising a solid preformed substrate of a hydrocarbon polymer of a molecular weight of at least 5000 having grafted thereinto a polymeric polysulfone formed by reaction between sulfur dioxide and an olefin and carrying a surface of the hydrocarbon polymer of the substrate integral with the polysulfone.

25. A pipe of claim 24 wherein the hydrocarbon polymer of the substrate is polyethylene.

26. A pipe of claim 25 wherein the olefin is ethylene.

References Cited in the file of this patent

UNITED STATES PATENTS

| | | |
|---|---|---|
| 1,988,550 | Gladhorn | Jan. 22, 1935 |
| 2,926,126 | Graham | Feb. 23, 1960 |